United States Patent [19]

Pantanelli

[11] 3,880,971

[45] Apr. 29, 1975

[54] CONTROLLING SHRINKAGE CAUSED BY SINTERING OF HIGH ALUMINA CERAMIC MATERIALS

[75] Inventor: Georges Pierre Pantanelli, Allentown, Pa.

[73] Assignee: Bell Telephone Laboratories, Incorporated, Berkeley Heights, N.J.

[22] Filed: Dec. 26, 1973

[21] Appl. No.: 428,434

[52] U.S. Cl. ...................... 264/56; 106/65; 264/40; 264/61; 264/66

[51] Int. Cl. ............................................ C04b 35/10

[58] Field of Search ................ 264/1, 56, 66, 61, 40

[56] References Cited

OTHER PUBLICATIONS

G. P. Pantonelli, "Infrared Transmission Properties of High Density Alumina," Amer. Ceram. Soc. Bull., Vol. 50, p. 962 (1971).

G. P. Pantonelli et al., "An Optical Method for Measuring Density of High Parity Alumina Ceramics," Amer. Cer. Soc. Bull., Vol. 53, pp. 239–242 (1974).

*Primary Examiner*—Donald J. Arnold
*Assistant Examiner*—John Parrish
*Attorney, Agent, or Firm*—E. B. Cave

[57] ABSTRACT

The shrinkage of a high alumina ceramic during sintering has been found to be related to the optical density of the green (unfired) material. Since shrinkage is dependent upon sintering conditions (time and temperature), measuring the optical density of the green material enables the proper selection of sintering conditions to achieve the desired shrinkage according to a predetermined relationship between optical density, shrinkage, time and temperature. The technique is expected to have particular utility in integrated circuit manufacture by enabling the accurate emplacement of "via" holes in high alumina ceramic substrates by punching the holes in the green substrate prior to sintering.

7 Claims, 1 Drawing Figure

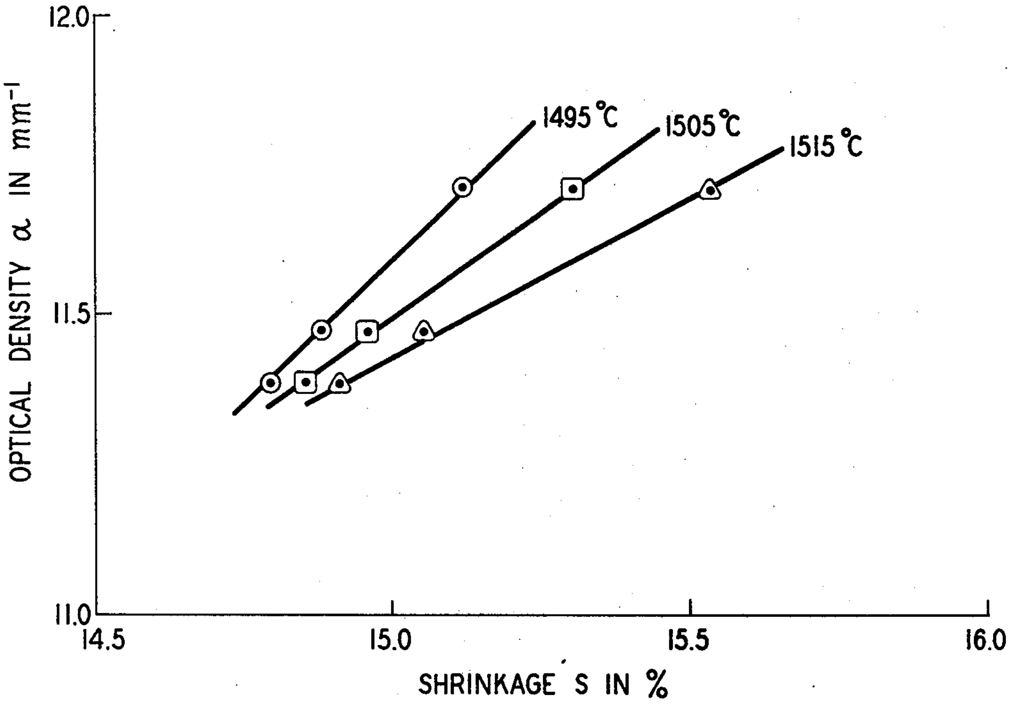
12.0
11.5
11.0
OPTICAL DENSITY α IN mm⁻¹
1495 °C
1505 °C
1515 °C
14.5
15.0
15.5
16.0
SHRINKAGE S IN %

CONTROLLING SHRINKAGE CAUSED BY SINTERING OF HIGH ALUMINA CERAMIC MATERIALS

BACKGROUND OF THE INVENTION

This invention relates to a method for controlling shrinkage during sintering of ceramic bodies.

In the manufacture of certain types of integrated circuits it is often desired to form so-called "via" holes in an insulating substrate through which metallizations on both sides of the substrate can be interconnected. In certain large-scale integration designs for telephone switching applications, as many as one hundred or more such "via" holes may be formed in a single substrate with a required accuracy of emplacement of the order of ±0.1 percent in order to achieve registry with subsequent metallizations formed from standardized pattern masks. At present, such accuracy of emplacement is achieved by laser machining the sintered substrate with the aid of accurate indexing means. The laser sequentially forms each "via" hole in about 1 second or less.

Nevertheless, it would be preferred to simply punch all of the holes simultaneously in the relatively soft greem ceramic body using a die punch array. This approach however has not been feasible due to the unpredictability of substrate shrinkage during sintering. For apparently identical milling, casting and sintering conditions, such shrinkage variations may reach ±1.5 percent or more for different raw materials or powder lots, and ±0.3 percent due to process variations between batches from the same powder lot. Factors thought to affect such shrinkage include impurity content, ratio of binder and/or solvent to ceramic material, crystalline form of the alumina powder and the reactivity of the powder. (In general, reactivity varies with surface area and particle size distribution of the powder).

While it is possible to fire test samples from each new batch or lot of ceramic material, such repeated test firings tend to be time consuming, a typical firing schedule requiring about 48 hours to complete. From a commercial standpoint such time delays effectively preclude the use of test firings to predict shrinkage and thus effectively preclude accurate hole emplacement by punching of the green substrate body.

SUMMARY OF THE INVENTION

In accordance with the invention, a method is described for controlling the shrinkage which a high alumina ceramic body undergoes during sintering, the method comprising measuring the optical density of the green (unfired) ceramic body to light of proper spectral distribution, and then sintering the body at a time and temperature sufficient to achieve a desired shrinkage during sintering according to a predetermined relationship between optical density, shrinkage, time and temperature. In this way, by the use of a punching die having spacings larger than the design distance between holes in the fired ceramic and by control of the firing conditions to produce a shrinkage which is predicted by measurement of optical density to compensate for the excess spacing in the die, a fired ceramic product falling within the permissible deviation of hole spacing can be consistently obtained.

This method is particularly useful in the manufacture of high alumina ceramic sheets used as substrates for integrated circuits.

The usefulness of the measurement of optical density for the purpose of the present invention is based on its correlation with physical density which is, in turn, the most important factor in the shrinkage. In order that the measurement reflect the physical density rather than the presence of differing amounts of impurities having specific regions of spectral absorption, it is necessary that the optical density be measured with light having a sufficient spectral component in regions other than those dominated by impurities. This can be accomplished by the use of light which is substantially "white," that is light from a source which emits wavelengths substantially continuously over at least the visible spectrum, i.e., 4,000 to 7,700 angstroms, such as light from a xenon source which extends from the ultraviolet through near infra-red portions of the electromagnetic spectrum, i.e., from 2,000 to 30,000 angstroms. Another example of a white light source is a tungsten source although, in general, xenon is preferred for its higher average intensity.

The term "optical density" may be defined by the following equation:

$$\frac{I_x}{I_o} = T^2 \exp(-\alpha x) \quad (1)$$

where $I_o$ is the intensity of the light source, $I_x$ is the measured intensity of light transmitted by the sample, T is the transmission coefficient, $\alpha$ is the optical density and $x$ is the thickness of the sample.

For the purposes of the invention, the term "high alumina ceramic body" refers to a body whose ceramic components are at least 95 weight percent $Al_2O_3$.

BRIEF DESCRIPTION OF THE DRAWING

The drawing is a graphical representation in which optical density $\alpha$ (in units of millimeters$^{-1}$) of a green 99 weight percent $Al_2O_3$ tape-cast substrate is plotted versus shrinkage S (in percent) during firing for firing temperatures of 1,495° C, 1,505° C and 1,515° C, respectively.

DETAILED DESCRIPTION OF THE INVENTION

While the method for controlling shrinkage during sintering described herein is not limited to a particular shape or forming technique, for convenience the method will be described mainly in terms of controlling the shrinkage of tape-cast bodies destined for use as integrated circuit substrates. Thus, while tape-cast substrates will normally be suited to the convenient determination of optical density due to their planarity and relatively small and invariant thicknesses, the optical density of other more complex shapes may also be determined.

To aid the practitioner, exemplary processing conditions for the manufacture of high alumina ceramics will now be described. The compositions, including ceramic powder which may have varying amounts and types of impurities and additives, such as for example MgO with or without $Y_2O_3$ to promote densification during sintering, with solvent, binder, lubricant, plasticizer, etc. are milled in a ball mill. Typical solvents for binders, plasticizers and lubricants are trichloroethylene or xylene in alcohol. Sometimes, in a so-called "double milling" technique, the binder or plasticizer or both are only added after milling is about one-half completed. While milling times of up to 24 hours total are adequate in many instances, it has been found that extending milling to up to 48 hours or longer sometimes enhances density of the sintered product, supposedly due to pick-up of densification promoting impurities, from attrition of the mill and balls.

After milling, the resultant slurry is poured into a supply tank from which the slurry is dispensed into a tape-casting container having one side opening above a moving tape carrier of a material such as mylar. A doctor blade is positioned above the opening and the thickness of the slurry which is cast onto the tape carrier is controlled by adjusting the height of the doctor blade. Additional control of tape-cast thickness is afforded by speed of the carrier and viscosity of the slurry. The tape is then allowed to air dry. If desired, drying may be aided by, e.g., a moving stream of hot air.

The dried tape, now referred to as being in the green state, is then peeled from the carrier. At this stage, and in accordance with the invention, the optical density of the tape is determined.

For calculating the optical density ($\alpha$) from the optical transmission measurements by the use of equation (1) above, it is necessary to have the value of the transmission coefficient (T). The transmission coefficient (T) is defined as:

$$T = 1\text{-}A$$

where A is the fraction of the light which is reflected. The reflected fraction (A) is in turn defined as:

$$A = \left(\frac{n_1 - n_2}{n_1 + n_2}\right)^2$$

where $n_1$ is the refractive index of the material being measured and $n_2$ is the refractive index of the surrounding ambient. When the material is measured in air, which has a refractive index of 1, this reduces to:

$$A = \left(\frac{n_1 - 1}{n_1 + 1}\right)^2$$

For high alumina ceramics, the refractive index can validly be taken as the refractive index of monocrystalline alumina, or sapphire, values of which are available in the published literature. The refractive index is taken at a wavelength representative of the spectral distribution of the source used for the optical density measurement. For a xenon light source, the value $n_1 = 1.764$ was taken as representative, yielding a value of 0.853 $\pm$ 0.005 for $T^2$.

The tape is then cut into substrates and the substrates punched to form "via" holes. The substrates are then sintered at a time and temperature sufficient to achieve the desired shrinkage during sintering according to a predetermined relationship between optical density, shrinkage, time, and temperature.

This relationship can be charted in a variety of ways. A convenient way is to determine and plot the variation of shrinkage with optical density for material fired for a constant firing time at a number of different firing temperatures covering the temperature region found to be most desirable for commercial operation. Thereafter, for any green material to be fired, it is only necessary to measure optical density and then, by plotting the point corresponding to this optical density and the required shrinkage, to determine the firing temperature by interpolating between the two nearest temperature lines on the chart. This procedure is, of course, valid only when the same processing conditions, measuring conditions and furnace are used.

A chart of this kind can be obtained by preparing, for each of the chosen firing temperatures, green tape-cast substrates of at least two different batch compositions which may have amounts and types of impurities, lubricants, plasticizers and solvents and varying amounts of the different crystalline forms of alumina such as $\alpha - Al_2O_3$, $\gamma - Al_2O_3$, etc., and determining their optical density.

After optical density has been determined, the substrates of each composition are sintered at chosen temperatures and then shrinkage during sintering is measured. The results, when plotted, will produce a series of lines, one for each firing temperature, as shown in FIG. 1.

Over the temperature range shown in FIG. 1, the variation of optical density with shrinkage is essentially linear so that the relationship can be defined $$\alpha = aS + b \qquad 3$$

where $a$ and $b$ are constants determined by the sintering conditions and the measuring conditions. It has been found convenient for determining curves such as those of FIG. 1 to vary temperature while holding time constant, i.e., within $\pm 2$ percent of a constant value, although it is recognized that time can also be varied while holding temperature constant. Sintering atmosphere is held invariant throughout the determination.

Once these relationships have been determined, they need not be redetermined except where changes in processing or measuring conditions have occurred.

While the permissible temperature variations to achieve the desired degree of control of shrinkage may sometimes be limited by the required final properties of the sintered body such as density, nevertheless, in the case of high alumina integrated circuit substrates, sintered densities may vary within the range of 3.85 to 3.90, thus permitting a temperature choice over a wide range, i.e., within the range from 1,400° to 1,600° C, depending upon composition and reactivity of the batch.

It is sometimes a practice in ceramic processing plants, where a large number of different compositions are being handled, to dye the batches different colors as an aid to identification. In such instances special attention to the use of the same dye in the same concentration for each composition will enable adequate determination of relationships between optical density and shrinkage. Alternatively, if the optical absorption spectrum of the dye is very small relative to the white light source, for example, less than one percent of the integrated area of the source spectrum, then the effect of the dye upon the optical density determination may be disregarded.

EXAMPLE

Tape-cast $Al_2O_3$ substrates were prepared as follows. Three different lots having the compositions and amounts shown in Table I were ball milled for 48 hours by the double milling technique described above.

TABLE I

| Ingredients | Amounts (Parts by Weight) A | B | C |
|---|---|---|---|
| $Al_2O_3$ | 61.26 | 61.34 | 61.25 |
| CaO | 0.04 | 0.04 | 0.04 |
| MgO | 0.22 | 0.06 | 0.21 |
| $SiO_2$ | 0.02 | 0.05 | 0.05 |
| trichloroethylene (solvent) | 21.61 | 21.64 | 21.60 |
| ethyl alcohol (solvent) | 8.41 | 8.43 | 8.41 |
| Ensign Z-3(menhaden oil: deflocculant | 1.13 | 1.13 | 1.13 |
| Butvar B-98*(polyvinyl butyral: binder | 2.46 | 2.46 | 2.46 |
| Elastex P-61*(octyl phthalate: plasticizer) | 2.22 | 2.22 | 2.22 |
| Ucon 2000*glycol: (polyethylene plasticizer) | 2.63 | 2.63 | 2.63 |

*added after 24°hours of milling
(Ensign Z-3, Butvar B-98, Elastic P-61 and Ucon 2000 are registered trademarks)

The milled compositions were then tape-cast into green (unfired) substrates, according to the procedure described above and the optical densities of these substrates were determined as follows: Specimens 1 × 2 centimeters were cut from sections along the center of the tapes and were affixed to microscope slides. A blank slide was placed on a microscope stage and, using a zenon light source below the stage, the image of the field diaphragm was focused on the top surface of the slide by adjusting the condenser, resulting in a light beam diameter of 500 micrometers. The measuring aperture of a Zeiss microphotometer was set to measure an area of 250 × 250 micrometers on the specimen's top surface. The intensity of the light beam, $I_o$, was measured. The specimen-bearing slide was then placed on the microscope stage and the top surface thereof brought into focus. $I_x$, or transmitted intensity was then measured. Several substrates from each lot were then die punched using dies with borided steel piercing punches and sintered at 1,495°C, 1,505°C and 1,515°C for about 6 hours and shrinkage measured. Results are plotted in FIG. 1 as optical density $\alpha$ in $mm^{-1}$ versus shrinkage S in percent along the width of the specimen, after firing at the mentioned temperatures.

What is claimed is:

1. The method of producing ceramic bodies the components of which comprise at least 95 weight percent $Al_2O_3$ containing at least a pair of identifiable benchmarks having a required spacing comprising producing an unfired ceramic body containing the benchmarks spaced apart a distance greater than the required spacing by an amount within the range of possible firing shrinkage of said ceramic and then firing said ceramic body wherein the improvement comprises measuring the optical density of said ceramic body prior to firing and then conducting the firing of said ceramic body at a temperature and for a time shown by prior assembled data correlating optical density and firing shrinkage to yield the degree of firing shrinkage which will produce the required spacing of said benchmarks in a ceramic of similar basic composition processed and measured under the same conditions.

2. The method of claim 1 in which the ceramic body is a ceramic sheet the components of which comprise at least 99 weight percent $Al_2O_3$.

3. The method of claim 2 in which said benchmarks are holes penetrating the ceramic sheet.

4. A process of producing fired ceramic sheets the components of which comprise at least 95 weight percent $Al_2O_3$ in which the optical density of the ceramic is measured before firing and then used as the basis for controlling the degree of shrinkage of said sheets upon firing.

5. Method for controlling shrinkage caused by sintering a green body of a ceramic material the components of which comprise at least 95 weight percent $Al_2O_3$ characterized by:

1. measuring the optical density $\alpha$ of the green body to white light, wherein optical density $\alpha$ is defined by the relationship $$\frac{I_x}{I_o} = T^2 \exp(-\alpha x)$$

where $I_o$ and $I_x$ are the incident intensity and transmitted intensity of the white light, respectively, $x$ is the thickness of the body and T is a constant defined as 1 $- n_1 - n_2$ 2$/n_1 + n_2$ where $n_1$ is the refractive index of the body and $n_2$ is the refractive index of the surrounding medium, and 2. sintering the green body at a time and temperature sufficient to achieve a desired shrinkage during sintering according to a predetermined empirical relationship between optical density, shrinkage, time and temperature.

6. The method of claim 5 in which the sintering time is maintained within ± 2 percent of a constant value, and the sintering temperature is varied to achieve the desired shrinkage.

7. The method of claim 5, wherein the white light is derived from a xenon light source, and the value of $n_1$ is taken as 1.764.

* * * * *